Patented Aug. 23, 1949

2,479,708

UNITED STATES PATENT OFFICE 2,479,708

MANUFACTURE OF CARBON BLACK

Fred H. Amon, Weston, Mass., assignor to Godfrey L. Cabot, Inc., Boston, Mass., a corporation of Massachusetts No Drawing. Application December 26, 1944, Serial No. 569,930

3 Claims. (Cl. 23—209.1)

This invention consists in a novel process for improving carbon black for use in compounding rubber and includes within its scope the improved carbon black product produced by the novel process of my invention.

The introduction of carbon black into rubber compounds before vulcanization results in a highly desirable increase in the strength, rigidity and wearing quality of the vulcanized rubber compounds. For many years it has been recognized that these characteristics of rubber may be improved by suitably selecting or treating the carbon black ingredient of the compound. For example, as explained in Reissue Patent No. 18,884, Wiegand, the strength and wear resistance of rubber may be improved by calcining and thus reducing the volatile content of impingement black used in compounding. Impingement carbon black produced under commercial conditions for use in rubber has an initial volatile content of from 4 to 7%, consisting of carbon dioxide, carbon monoxide, oxygen, hydrogen, nitrogen, etc. By calcining such commercial carbon black, subsequent to manufacture, in a non-oxidizing atmosphere at a temperature above 1000° F. the volatile content may be reduced by as much as 2 or 3% and a so-called "deactivated" carbon black produced having the advantages above mentioned when used in compounding rubber. One of the advantages claimed for carbon black produced by this calcination is that rubber compounds in which it is included vulcanize at a much higher or faster rate than do the same compounds including uncalcined impingement carbon black. It is claimed that the period of cure can in many instances be reduced to one-half or one-third of the time required for compounds containing uncalcined black.

On the other hand, it is well known, for example as explained in Reissue Patent No. 19,664, Damon, that the volatile content of impingement carbon black may be increased by subjecting the carbon black to heating in an oxidizing atmosphere. The latter process is used in treating carbon black intended for use in the manufacture of inks, paints and lacquers. Increased volatile content not only does not improve the treated carbon black for use in compounding rubber, but when carbon black of high volatile content is used, it produces rubber compounds of poor quality and so is objectionable in that respect.

I have discovered that unexpected and unpredictable improvements in characteristics of carbon black as an ingredient of vulcanized rubber compounds may be realized by first increasing the volatile content of the carbon black by any convenient treatment and then decreasing its volatile content to approximately equal to its initial content. Carbon black so treated is not deactivated. Adsorption and absorption properties indicate a more active product. Carbon black treated in this manner does not cause rubber to vulcanize at a higher rate; in fact, it may tend to slow down the rate of cure of the rubber compound in which it is mixed, although by careful control and treatment this factor may be rendered practically negligible. The effect of the carbon black treated in accordance with my invention upon the rigidity or modulus of the resulting compound and upon its wear-resisting characteristics is beneficial and valuable to a striking degree. For example, when mixed in a formula consisting of

| | Parts |
|---|---|
| Rubber | 100.0 |
| Carbon black | 45.0 |
| Sulphur | 3.0 |
| Pine tar | 3.0 |
| Stearic acid | 4.0 |
| Mercaptobenzothiazole | 0.9 |
| Antioxidant (AgeRite Hipar) | 1.0 |
| Zinc oxide | 5.0 | the modulus of a test piece at 400% elongation may be increased from 2,000 pounds per square inch to 3,200 pounds per square inch and the abrasion resistance of a sample may be increased as much as 30% compared with a sample compounded with commercial carbon black or calcined impingement carbon black.

In carrying out the process of this invention, the steps of increasing the volatile content of the carbon black may be effected by any one of the following equivalent operations (1) by heating the carbon black under substantially atmospheric conditions to a temperature of 750–800° F., (2) by treating with nitric acid in accordance with the process disclosed in United States Letters Patent No. 2,420,810, May 20, 1947, Bray, Gabry and Wendell, or (3) by treating with ozone.

It should be noted that the second step of my novel process is not by any means a calcining of impingement carbon black. It requires carbon black which is different from any directly produced impingement carbon black, that is to say, it requires a special black in which the volatile content has been definitely and appreciably increased above that of the original product of the flame.

I am uncertain as to the scientific theory which explains the results of my discovery and invention. It may be that in compounding carbon black so treated with rubber the bond between adjacent molecules of rubber and the surface carbon atoms is intensified and possibly this is due to an increased activation of the surface of the carbon. In increasing the volatile content and then decreasing it, it may be that surface carbon atoms are plucked away by the oxygen, thus increasing the surface area of the particles which comes in contact with the rubber by etching their surfaces. Such a working hypothesis would appear to satisfy the observed effects although, as stated above, I do not wish to restrict myself to this explanation.

As a typical, but not limiting, example of the advantageous practice of my invention I may take a commercial impingement carbon black, known as Cabot Grade 6 and accepted in the carbon black industry as a standard impingement black, having a normal volatile content of 4 to 7% and increase its volatile content by heating under substantially atmospheric conditions. This step may be carried out by heating the carbon black in a rotary furnace at about 750° F. for about one hour with excess air and its volatile content thus increased to 10 or 12%. This treated carbon black may now be devolatilized by heating at a temperature of about 1200° F. for about half an hour with air excluded or in a neutral or reducing or non-oxidizing atmosphere and the volatile content reduced again to substantially its normal or initial value. When such carbon black is used in compounding rubber an increase of 500 to 1,000 pounds in modulus results and there is also a remarkable increase in abrasion resistance of 15 to 20%. The carbon black produced as above suggested can best be distinguished from other known carbon black products by its beneficial effects which appear when it is used as an ingredient of vulcanized rubber compounds.

In comparing the characteristics and general behavior of impingement carbon black calcined in accordance with the disclosure of the Wiegand Reissue Patent No. 18,884 at a temperature not less than 1200° F. in a non-oxidizing atmosphere, with impingement carbon black treated in accordance with the invention of the present application, that is to say, by first increasing and then immediately decreasing the volatile content of the carbon black by any convenient treatment herein suggested, the following facts should be noted:

(1) The volatile content of the Amon treated black was decreased less than 1% as compared to the volatile content of the untreated black (from 5.47% to 5.0%), whereas the Wiegand black is characterized by a decrease in volatile content of "not less than 1%."

(2) The adsorptive capacity of the Amon treated black was increased as compared to the untreated black from 14.8% to 23.1%, whereas the adsorptive capacity of the Wiegand treated black is specified as reduced as compared to the untreated black.

(3) Tests making a direct comparison in respect to (1) Modulus—400%, (2) Tensile strength, and (3) Abrasion loss, between (A) Standard untreated carbon black, viz. "Cabot Grade 6," (B) the same carbon black treated by the Wiegand process, and (C) the same carbon black treated by the Amon process, show the following results:

| (A) Standard Black | (B) Wiegand Process Black | (C) Amon Process Black |
|---|---|---|
| MODULUS—400% | | |
| 2,200 | 2,700 | 2,800 |
| TENSILE STRENGTH | | |
| 4,910 | 4,830 | 4,950 |
| ABRASION LOSS | | |
| 185 | 168 | 153 |

The figures set down under the heading "Abrasion loss" are cubic centimeters of rubber ground in a DuPont or Williams abrader from test disks compounded respectively with the three different carbon blacks. This is the standard instrument adopted by A. S. T. M. and used by all rubber companies for testing the effect of various fillers in rubber compounds on their resistance to abrasion. It is noted that the compound containing standard carbon black lost by abrasion 20.9%, and that the compound containing Wiegand carbon black lost 9.8% more than the compound containing carbon black treated by the Amon process, as shown by the above figures.

Measurements of the surface area of a unit weight of the improved carbon black product by the adsorption of nitrogen indicate that surface area has been increased but other observable physical properties, such as volatile content, D. P. G. adsorption, color, density, etc. give no indication of the valuable characteristic which has been imparted to it as an ingredient of rubber compounds.

There is apparently no critical limit to the interval of time occurring between the first and second steps of my novel process although it is important that the treated carbon black should be kept in a dry condition between the two steps, or at least dried out before being subjected to the devolatilizing step of the process.

While in the best and most practicable procedure for carrying out the process of my invention now known to me the steps of increasing and of decreasing the volatile content of the impingement carbon black are separated by an appreciable time interval, it is contemplated that by precise control of conditions the two effects may be produced simultaneously or substantially so in different parts of the same batch or charge and such procedure is within the scope of my invention.

This application is a substitute for and continuation in part of my copending application Ser. No. 379,865, filed February 20, 1941.

Having thus disclosed my invention and described in detail one illustrative manner in which it may be carried out, I claim as new and desire to secure by Letters Patent:

1. The process of improving carbon black for compounding with rubber, which consists in oxidizing impingement carbon black at about 750° F. for about two hours while air is admitted to the carbon black under treatment and thereby increasing its volatile content, and then devolatilizing the same carbon black by heating it at about 1200° F. for about one half hour while air is excluded therefrom.

2. The process of improving carbon black for compounding with rubber, which consists in oxidizing carbon black having an initial volatile content of 4% to 7% until its volatile content rises to 10 or 12%, and then devolatilizing the said oxidized carbon black to decrease its volatile content to substantially its initial proportion.

3. The process of improving carbon black for use in compounding rubber, which consists in first heating carbon black in air and thereby increasing its volatile content by about 4 to 8%, maintaining the treated carbon black in a dry condition, and then heating the said carbon black in a non-oxidizing atmosphere until its volatile content is decreased substantially to its initial amount.

FRED H. AMON.

REFERENCES CITED

The following references are of record in the file of this patent:

UNITED STATES PATENTS

| Number | Name | Date |
| --- | --- | --- |
| Re. 18,884 | Wiegand | June 27, 1933 |
| 1,780,154 | Gardner | Nov. 4, 1930 |
| 1,999,541 | Keller | Apr. 30, 1935 |
| 2,292,355 | Ayers | Aug. 11, 1942 |

OTHER REFERENCES

Johnson, Industrial & Engineering Chemistry, vol. 21; (Dec. 1929) pages, 1288–1290.

Wiegand, India Rubber World; Dec. 1941, pages 270–272.

Carson et al., Industrial & Engineering Chemistry, vol. 21; Oct. 1929, pages 911–914.

Wiegand et al., Rubber Age; March 1942, pages 431–436.